(12) United States Patent
Davidson et al.

(10) Patent No.: US 7,346,794 B1
(45) Date of Patent: Mar. 18, 2008

(54) METHOD AND APPARATUS FOR PROVIDING CLOCKING PHASE ALIGNMENT IN A TRANSCEIVER SYSTEM

(75) Inventors: Scott Allen Davidson, Savage, MN (US); Jerry Chuang, Sunnyvale, CA (US); David E. Tetzlaff, Minnetonka, MN (US); Jerome M. Meyer, Chanhassen, MN (US)

(73) Assignee: Xilinx, Inc., San Jose, CA (US)

( * ) Notice: Subject to any disclaimer, the term of this patent is extended or adjusted under 35 U.S.C. 154(b) by 483 days.

(21) Appl. No.: 11/040,423

(22) Filed: Jan. 21, 2005

(51) Int. Cl.
*G06F 1/12* (2006.01)
*G06F 7/00* (2006.01)
*G06F 1/04* (2006.01)
*G06F 1/00* (2006.01)

(52) U.S. Cl. .................. 713/400; 713/500; 713/503; 713/600

(58) Field of Classification Search ............... 713/400, 713/500, 600, 503
See application file for complete search history.

(56) References Cited

U.S. PATENT DOCUMENTS

| | | | |
|---|---|---|---|
| 5,052,028 A * | 9/1991 | Zwack | 375/358 |
| 5,087,829 A * | 2/1992 | Ishibashi et al. | 327/152 |
| 5,742,799 A * | 4/1998 | Alexander et al. | 713/401 |
| 5,950,115 A * | 9/1999 | Momtaz et al. | 455/73 |
| 6,173,380 B1 * | 1/2001 | Jin et al. | 711/167 |
| 6,473,485 B1 * | 10/2002 | Fernandez-Texon | 377/27 |
| 6,549,046 B1 * | 4/2003 | Klecka, III | 327/153 |
| 6,617,877 B1 * | 9/2003 | Cory et al. | 326/41 |
| 6,622,255 B1 * | 9/2003 | Kurd et al. | 713/503 |
| 6,718,477 B1 * | 4/2004 | Plants et al. | 713/500 |
| 6,727,768 B1 * | 4/2004 | Dasgupta | 331/143 |
| 6,973,151 B2 * | 12/2005 | Lysdal et al. | 375/371 |
| 7,020,729 B2 * | 3/2006 | Taborek et al. | 710/305 |
| 7,131,024 B1 * | 10/2006 | Venkata et al. | 713/500 |
| 2002/0006177 A1 * | 1/2002 | Pickering et al. | 375/371 |
| 2003/0002516 A1 * | 1/2003 | Boock et al. | 370/412 |
| 2003/0197537 A1 * | 10/2003 | Saint-Laurent | 327/165 |
| 2004/0234000 A1 * | 11/2004 | Page | 375/259 |
| 2005/0005051 A1 * | 1/2005 | Tseng | 710/310 |

OTHER PUBLICATIONS

Xilinx, Inc., "RocketIO™ X Transceiver User Guide", ug035, v1.4, Jun. 29, 2004, pp. 1-182, available from Xilinx Inc., 2100 Logic Drive, San Jose, CA 95124.

* cited by examiner

*Primary Examiner*—Thomas Lee
*Assistant Examiner*—Ji H Bae
(74) *Attorney, Agent, or Firm*—LeRoy D. Maunu; Kim Kanzaki

(57) ABSTRACT

A method and apparatus for providing clock phase alignment in a transceiver system are disclosed. Circuits are provided for providing clock phase alignment to adjust and align the phase between clock domain boundaries and for maintaining alignment of multiple outputs signals.

8 Claims, 12 Drawing Sheets

METHOD AND APPARATUS FOR PROVIDING CLOCKING PHASE ALIGNMENT IN A TRANSCEIVER SYSTEM

FIELD OF THE INVENTION

This disclosure relates in general to transceiver clocking in integrated circuits, and more particularly to a method and apparatus for providing clocking phase alignment in a transceiver system.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

A transceiver includes a transmitter and a receiver. The transceiver typically operates with at least two clock signals, a transmit clock signal (TCLK) and a sampling clock signal. The TCLK signal is used by the transmitter to regulate transmission of data symbols. The sampling clock signal is used by the receiver to regulate sampling of the received signal.

Synchronous systems depend on precise clock distribution for high performance. Clock skew is defined as the difference in time between simultaneous clock transitions within a system. Clock networks must be designed to minimize skew or the differences in delay throughout a clocking network. The ideal is that every component that needs clocking should receive the edge of the clock at the same time within each clock period. Fully synchronous designs require this methodology and are highly recommended since they can tolerate higher clock rates and make it easier to perform timing analysis. Synchronous operation means that all of the devices that need clocks in the system use the same clock signal. To ensure that the network operates as closely to the ideal as possible, the skew must be minimized along the entire clocking network. This ensures that all sequential elements see a common clock edge.

Traditional multi-gigabit transceiver designs use integrated transmit and receive buffers to handle the inherent phase difference between clock domains, such as between the physical coding sublayer (PCS) and the physical media attachment (PMA) clock domains or between the FPGA fabric and transceiver. These buffers introduce both latency and uncertainty to both the transmit and receive data paths. Thus, such buffers are undesirable for many applications. Such problems may occur between other boundaries.

Furthermore, in channel-bonded applications where multiple outputs are bonded to provide a single channel, skew between multiple outputs must be controlled. With a large number of transceivers on a chip and with programmable clock routing, maintaining the alignment of multiple outputs can be difficult. Transmit outputs of multiple transceivers must be deskewed or skewed to compensate for misalignment.

It can be seen then that there is a need for a method and apparatus for providing clocking phase alignment in a transceiver system.

SUMMARY

To overcome the limitations described above, and to overcome other limitations that will become apparent upon reading and understanding the present specification, the present invention discloses a method and apparatus for providing clocking phase alignment in a transceiver system.

Embodiments of the present invention solve the above-described problems by using circuits that provide clock phase alignment between clock domain boundaries and that maintain alignment of multiple outputs.

An embodiment according to the present invention includes a first functional module clock generator for generating a first functional module parallel clock and a phase alignment device, coupled to the first functional module clock generator, for receiving a second functional module parallel clock and phase aligning the first functional module parallel clock to the second functional module parallel clock or to another reference clock. The first functional module may include a physical medium attachment layer and the second functional module may include a physical coding sub-layer. To provide phase alignment in a plurality of outputs, the skew for a plurality of drivers is controlled or a static phase offset signal is injected at an output of a charge pump output and an input of a loop filter to adjusting an output phase of a local oscillator of a phase locked loop.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing clocking phase alignment in a transceiver system. Circuits are used to provide clock phase alignment between clock domain boundaries. Circuits are also used to maintain alignment of multiple outputs.

Figure 1:
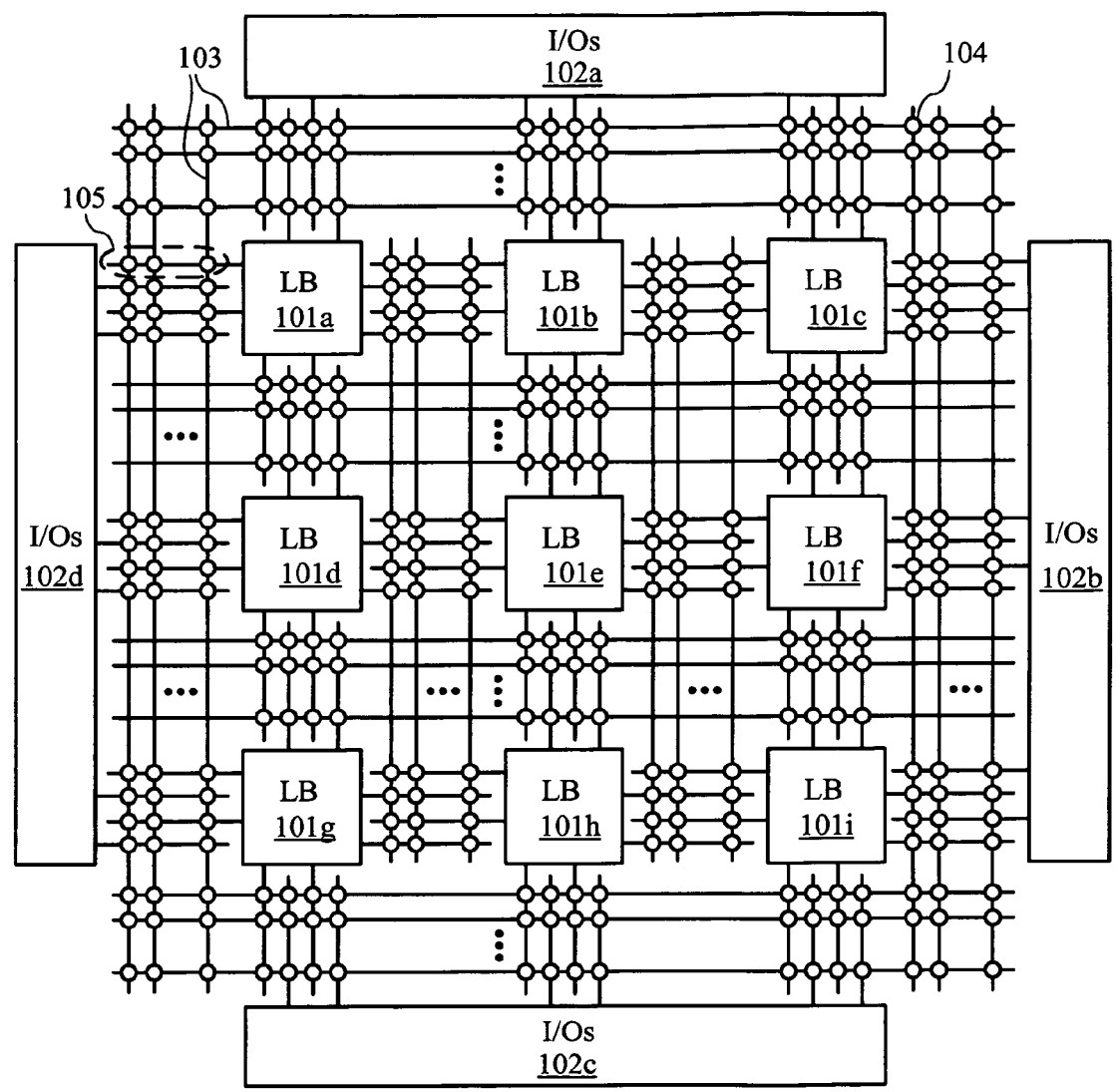
FIG. 1 is a simplified illustration of an exemplary FPGA.

FIG. 1 is a simplified illustration of an exemplary FPGA. The FPGA of FIG. 1 includes an array of configurable logic blocks (LBs 101a-101i) and programmable input/output blocks (I/Os 102a-102d). The LBs and I/O blocks are interconnected by a programmable interconnect structure that includes a large number of interconnect lines 103 interconnected by programmable interconnect points (PIPs 104, shown as small circles in FIG. 1). PIPs are often coupled into groups (e.g., group 105) that implement multiplexer circuits selecting one of several interconnect lines to provide a signal to a destination interconnect line or logic block. Some FPGAs also include additional logic blocks with special purposes (not shown), e.g., DLLs, RAM, and so forth.

Figure 2:
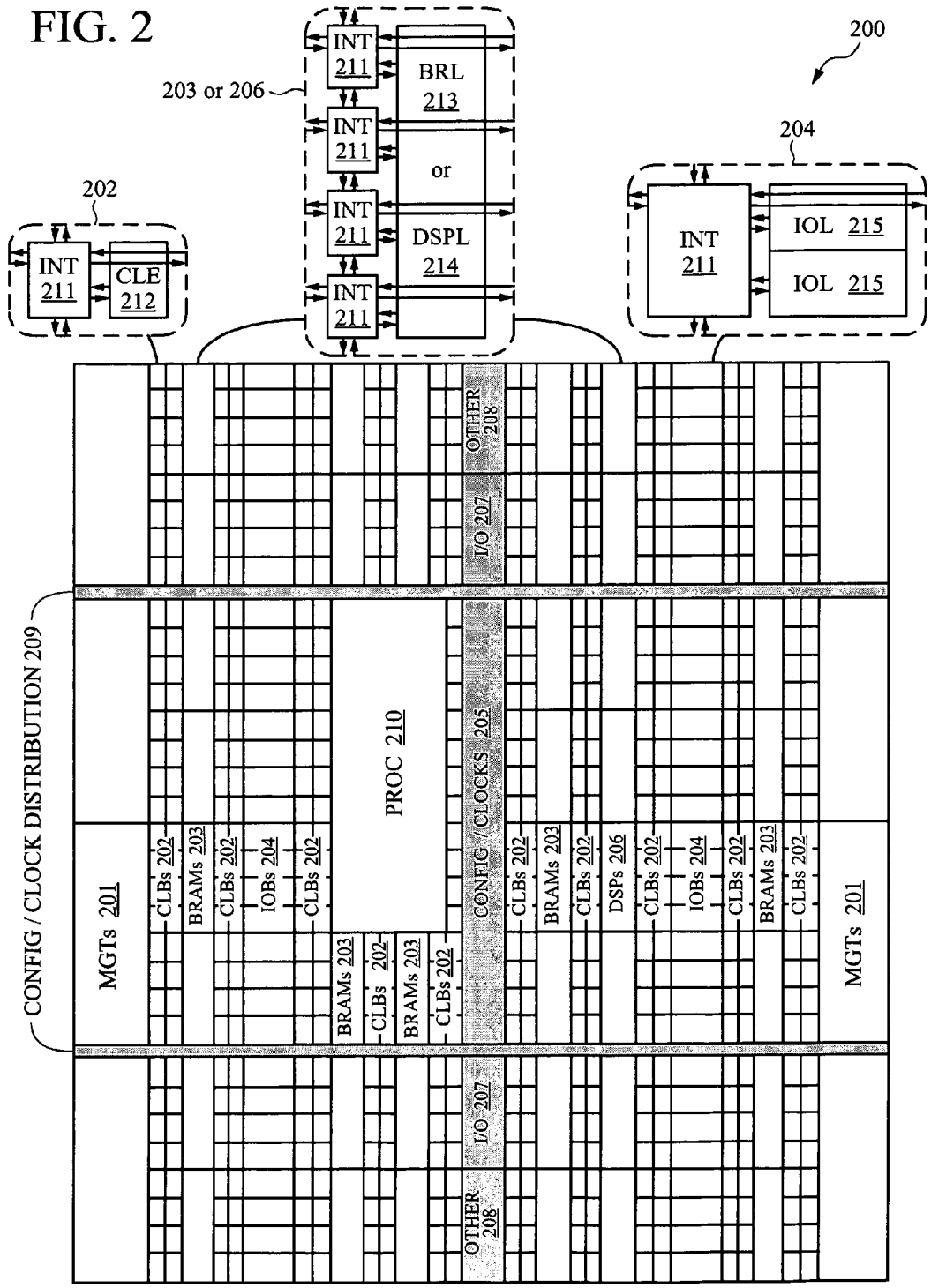
FIG. 2 illustrates an FPGA architecture according to an embodiment of the present invention.

FIG. 2 illustrates an FPGA architecture 200 according to an embodiment of the present invention. As noted above, advanced FPGAs can include several different types of programmable logic blocks in the array. For example, in FIG. 2, the FPGA architecture 200 includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), and other programmable logic 208 such as digital clock managers, analog-to-digital converters, system monitoring logic, and so forth. Some FPGAs also include dedicated processor blocks (PROC 210).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element (INT 211) also includes the connections to and from the programmable logic element within the same tile, as shown by the examples included at the top of FIG. 2.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 2) is used for configuration, clock, and other control logic. Horizontal areas 209 extending from this column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, the processor block PROC 210 shown in FIG. 2 spans several columns of CLBs and BRAMs.

Configuration logic 205 allows configuration data values to be loaded into the FPGA architecture 200. In accordance with an embodiment of the present invention, the configuration data takes into consideration the actual location of a circuit in the package, which can result in increased circuit performance. Placement based information is provided to the FPGA architecture 200 that will optimize its performance.

Note that FIG. 2 is intended to illustrate only one example of an FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 2 are purely exemplary. For example, in an actual FPGA more than one adjacent column of CLBs is typically included wherever the CLBs appear, to facilitate the efficient implementation of user logic.

Figure 3:
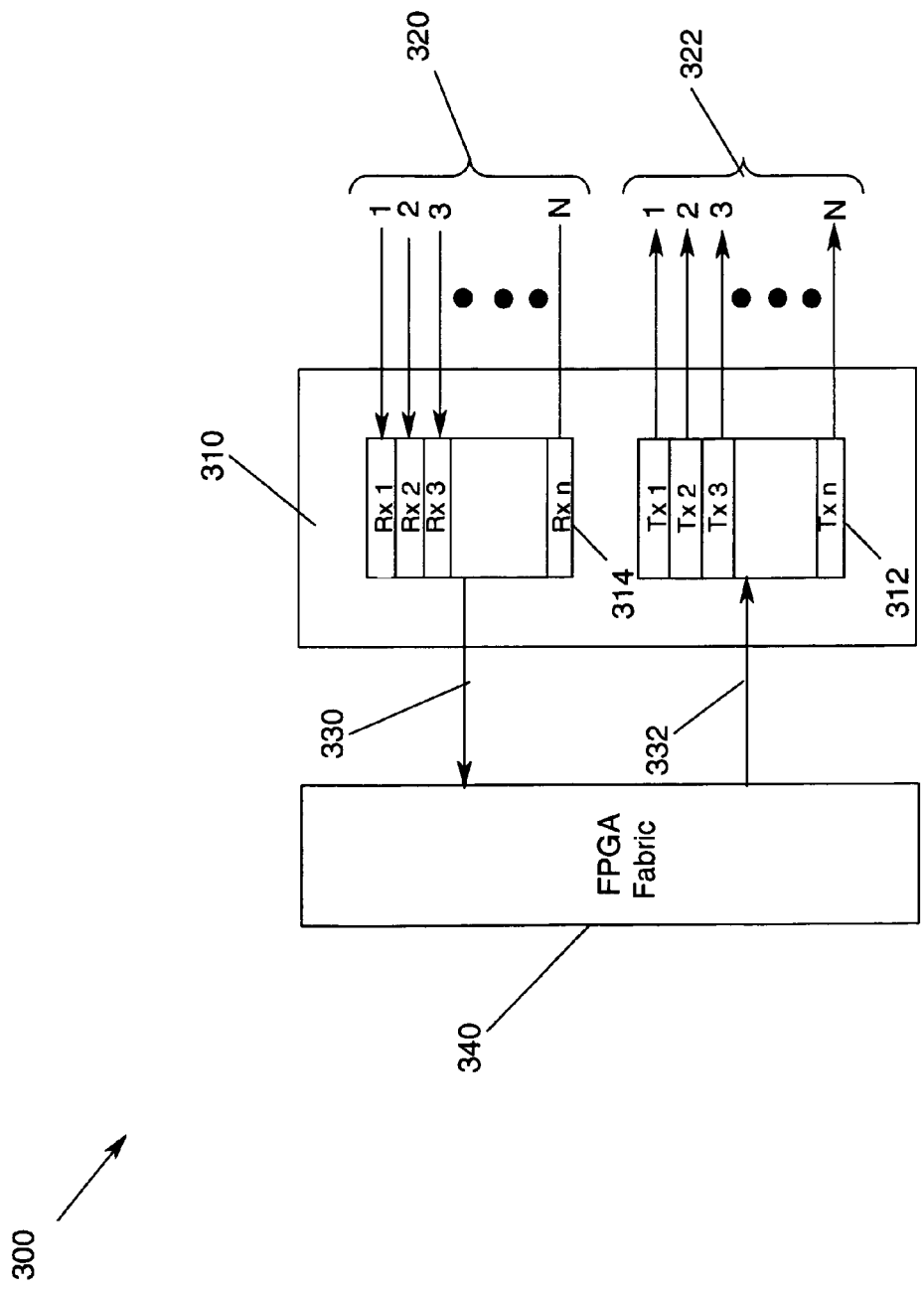
FIG. 3 is a block diagram illustrating channel bonding according to an embodiment of the present invention.

FIG. 3 is a block diagram 300 illustrating channel bonding according to an embodiment of the present invention. In FIG. 3, multiple transceivers represented by block 310 are provided in parallel to provide higher data rates. Words of data are split into bytes, with each byte sent over a separate channel (transceiver). Tying several serial channels together creates one aggregate channel. Several channels may be fed on the transmit side by one parallel bus and reproduced on the receive side as the identical parallel bus using multiple transceiver. For example, a plurality of transmitters 312 may be fed on the transmit side by one parallel bus 332 from a fabric 340. Several serial transmit channels are tied together to create one aggregate transmit channel 332. On the receive side, several serial receive channels 320 may be used by a plurality of receivers 314 to produce a similar parallel data stream 330. Bonding multiple parallel channels together allows the transfer of wider databuses from one point to another point. Accordingly, a very high point-to-point bandwidth may be achieved.

Figure 4:
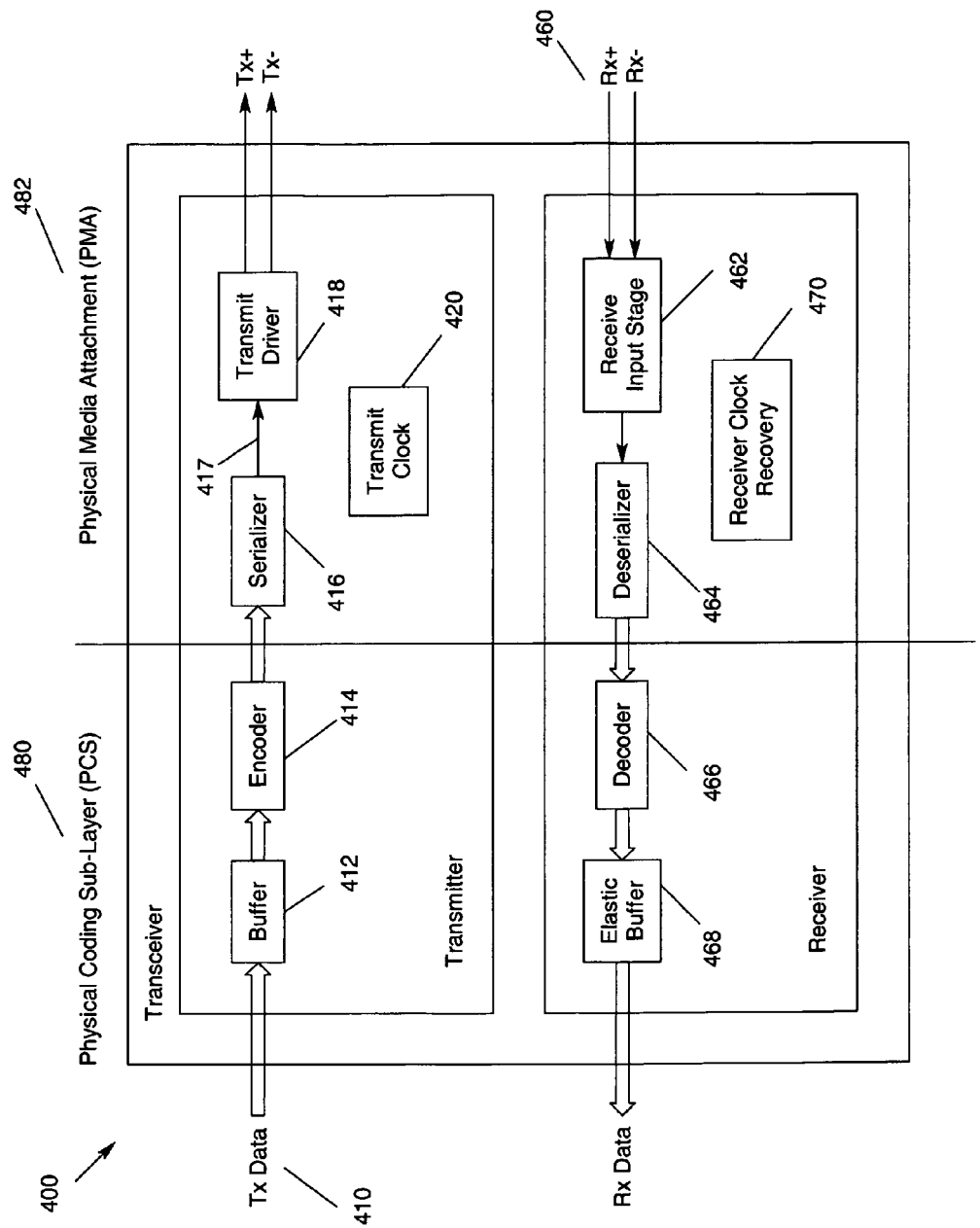
FIG. 4 is a block diagram of a transceiver using a transmit and receive buffer according to one embodiment of the present invention.

FIG. 4 is a block diagram 400 of a transceiver using a transmit and receive data buffer according to one embodiment of the present invention. In FIG. 4, parallel data 410 is received in a buffer 412, such as a FIFO buffer. The data is encoded by an encoder 414 according to a desired coding scheme. The data is then serialized 416. As described above with reference to FIG. 3, multiple parallel channels may be bonded together to allow the transfer of wider databuses. The serialized data 417 is provided to a transmit driver 418 for transmission according to a transmit clock 420. On the receiver side, serial data 460 is received at a receive input stage 462 and clocked according to receive clock 470. The data is deserialized 464 and then decoded by a decoder 466. The decoded parallel data is provided to elastic buffer 468. A transceiver requires the use of integrated transmit 412 and receive 468 buffers to handle the phase difference between the PCS and PMA clock domains. In FIG. 4, the PCS portion 480 is on the left and the PMA portion 482 is on the right.

According to an embodiment of the present invention a device for providing synchronous clocking phase adjustment between the generated clock of a first functional module and the clock of a second functional module is provided. Thus, applications, for example, not requiring the functionality provided by the receiver elastic buffer, i.e., clock correction and channel bonding, can operate in a lower latency mode. In such an arrangement, the synchronous mode of operation may use the high speed serial clock in the PMA to phase align the PMA generated clock to the forwarded synchronous PCS clock. Accordingly, circuits for providing clock phase alignment adjust and align the phase between the boundaries and maintain alignment of multiple outputs.

Figure 5:
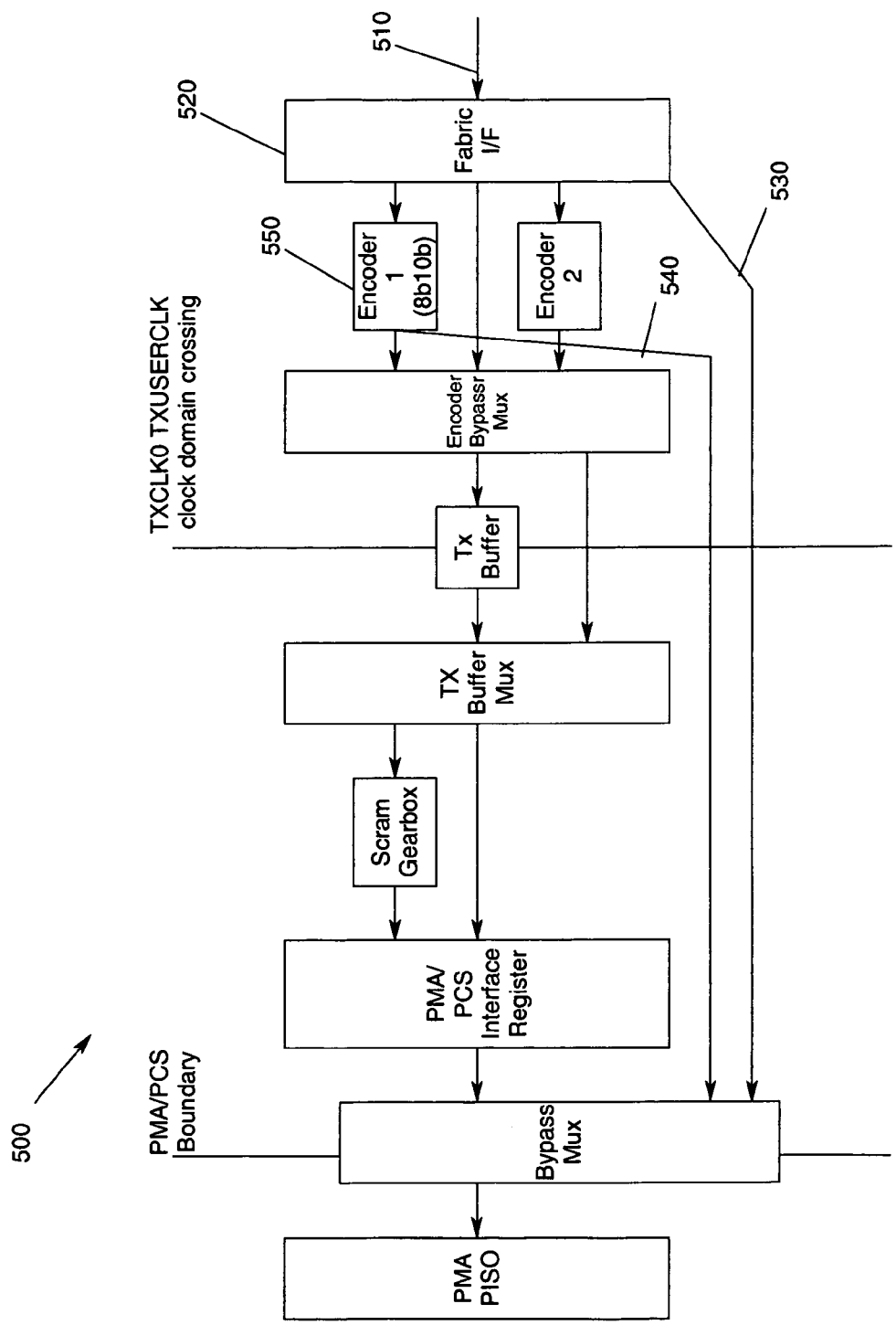
FIG. 5 is a detailed block diagram of the transmit PCS datapath with the bypass options for improving latency according to an embodiment of the present invention.

FIG. 5 is a detailed block diagram 500 of the transmit PCS datapath with the bypass options for improving latency according to an embodiment of the present invention. Both the transmit and the receive data path latencies vary. This latency is of particular problem at lower speeds, e.g., less than about 3.0-3.2 Gbps. Latency may be improved by providing function bypass options for applications that do not use the integrated PCS functions. In FIG. 5, TXData 510 from the fabric is received at a fabric interface 520. One bypass option 530 provides the TxData directly out of the fabric interface 520. Another bypass option 540 allows the TxData to be taken out of the 8b10b encoder 550 and routed directly into the PMA input register.

Figure 6:
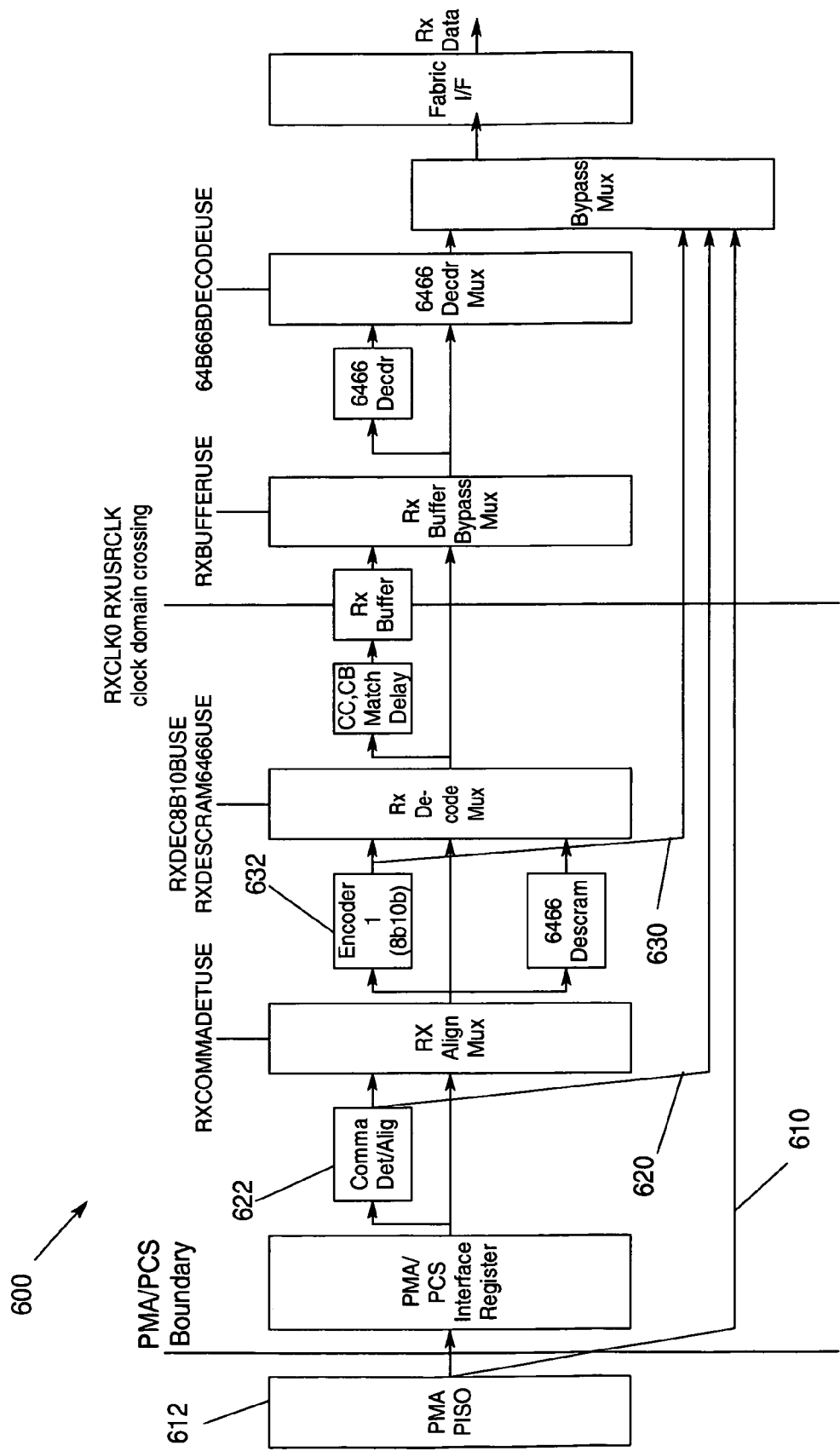
FIG. 6 is a block diagram of the receive PCS datapath with the bypass options for improving latency according to an embodiment of the present invention.

FIG. 6 is a detailed block diagram 600 of the receive PCS datapath with the bypass options for improving latency according to an embodiment of the present invention. To improve latency in the receive PCS datapath, bypass options are included in the PCS to minimize latency when integrated functions are not required by the application. In the receive PCS datapath 600, a first bypass options 610 allows the data to be taken directly from the PMA (unaligned) 612. A second bypass option 620 allows the data to be taken directly from the Comma detect/alignment block 622. A third bypass option 630 allows the data to be taken directly from the 8b10b decoder 632. Accordingly, bypass options allow the improvement of latency for applications that do not use the integrated PCS functions.

Figure 7:
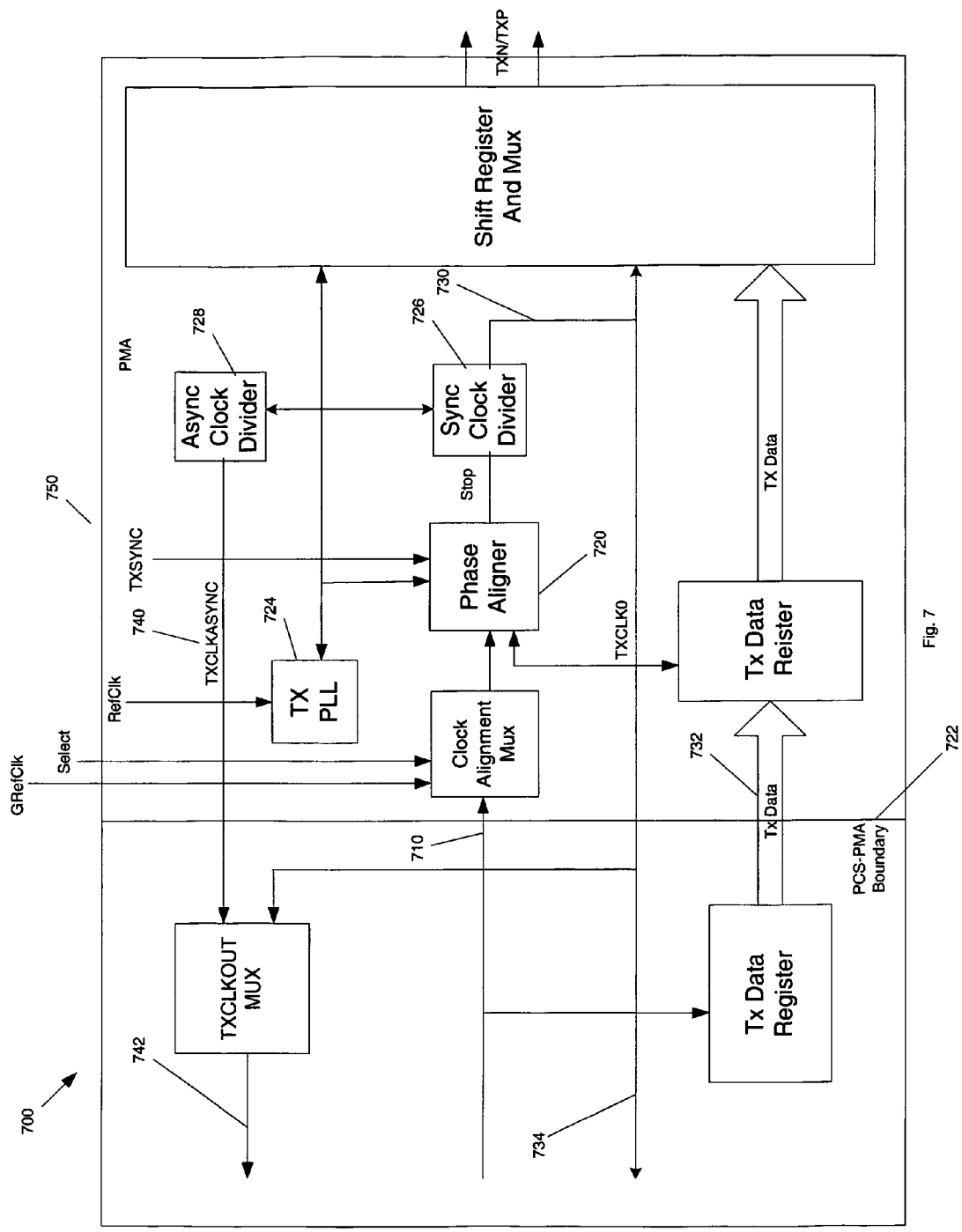
FIG. 7 is a block diagram of a transmit PCS/PMA interface according to an embodiment of the present invention.

FIG. 7 is a block diagram 700 of a transmit PCS/PMA interface according to an embodiment of the present invention. Both the transmit and receive XCLK trees forward a clock 710 to the phase alignment circuit in the PMA. The phase alignment circuit 720 handles the inherent phase differences in the PCS/PMA clock domain crossing 722. The parallel clocks in the PMA are derived from the output of the PLL 724 and two independent dividers: sync 726 and async 728. A TXCLKO signal 730 is generated from the sync divider 726, which is in phase with the data 732 and drives the root of the PCS XCLK tree 734 when the PCS buffers are used. The clock 740 generated from the async divider 728, TXCLKASYNC, is driven out to the FPGA clock tree 742 and can be used as the logic clock for the transmitter logic in the fabric and fed back into the TXUSR clocks.

Since the PCS XCLK tree and PMA TXCLKO have an unknown phase relationship, the phase alignment circuit is used to manage the phase difference between the clock domains and guarantee that setup and hold times are met at the PCS/PMA boundary 722. Note that the phase adjustment circuit 720 only adjusts the phase of TXCLKO 730 and not TXCLASYNC 740. The phase aligner 720 aligns the phase of TXCLKO 730 to the phase of PCS XCLK 710. The TXSYNC fabric signal 750 enables the phase alignment circuit 720. Phase adjustment is a one-time event and occurs when TXSYNC 750 is transitioned from low to high. Phase alignment is not initiated until the PLL 724 is locked.

Figure 8:
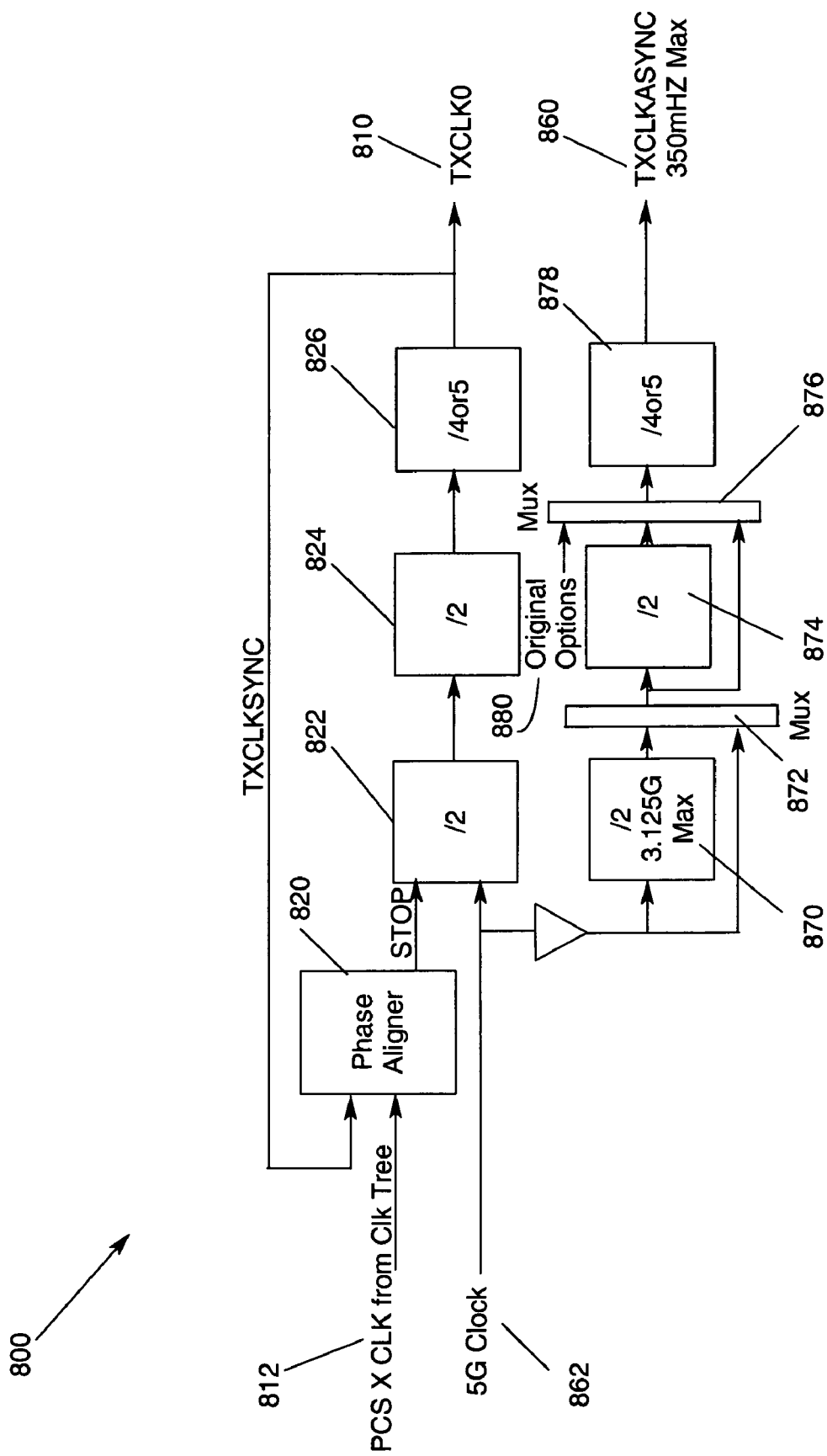
FIG. 8 is a block diagram showing details of the PMA dividers according to an embodiment of the present invention.

FIG. 8 is a block diagram 800 showing details of the PMA dividers according to an embodiment of the present invention. In FIG. 8, the parallel clocks in the PMA, i.e., TXCLKO 810 and TXCLKASYN 860, are derived from the PLL output 862 and the dividers. The clock from the PCS XCLK tree 812 is forwarded clock to the phase aligner 820. The TXCLKO clock 810 is generated from the sync divider, i.e., /2 822, /2 824 and /4 or 5 826 dividers. The phase aligner 820 aligns the TXCLKO 810 and the PCS XCLK 812. The PLL output 862 is provided to the async dividers, i.e., /2 divider 870, mux 872, /2 divider 874, mux 876 and /4 or 5 divider 878. The TXCLKASYNC clock 860 is driven out to the FPGA clock tree and can be used as the frequency reference for the transmitter logic in the fabric.

Figure 9:
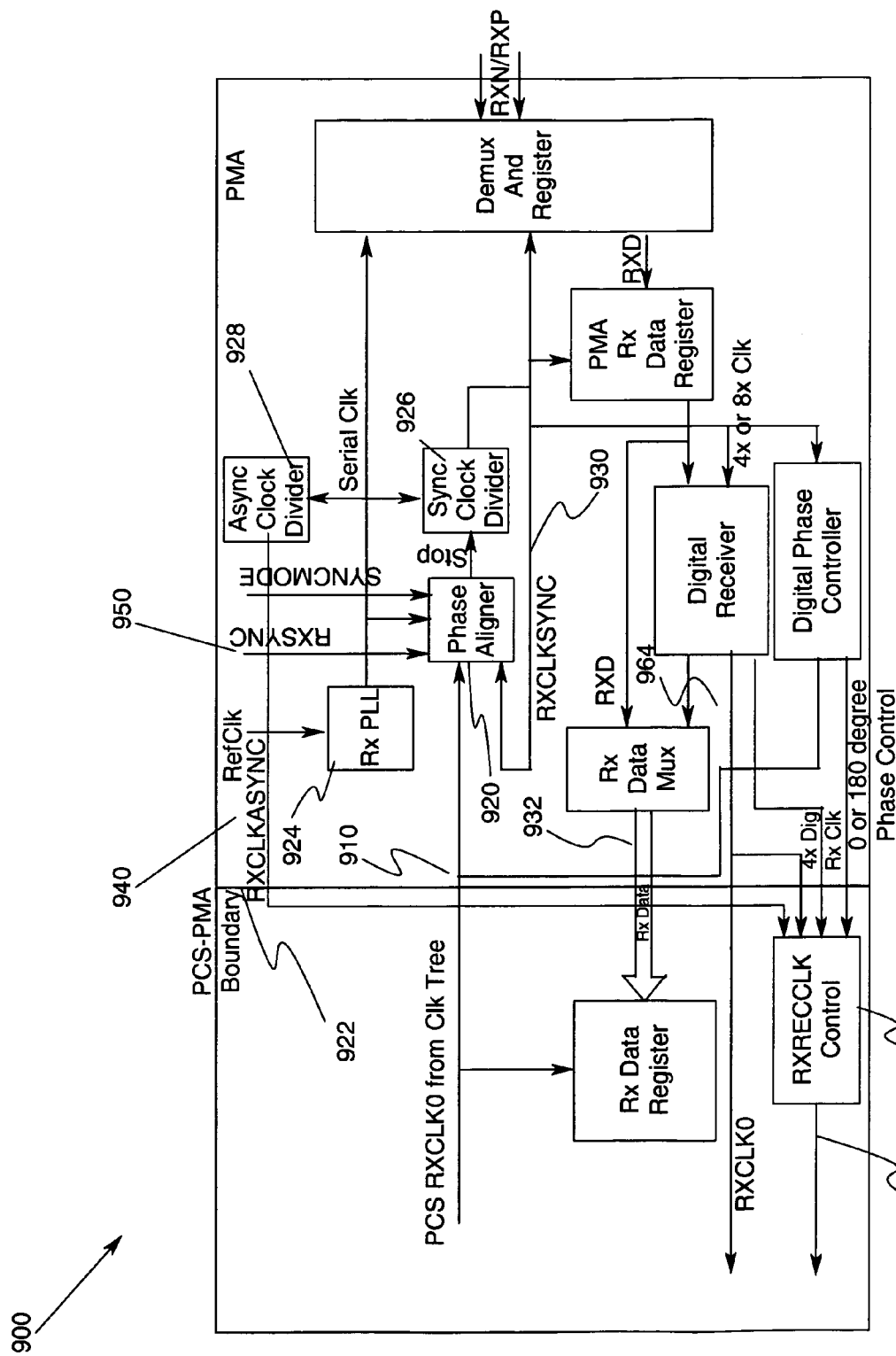
FIG. 9 is a block diagram of a receive PCS/PMA interface according to an embodiment of the present invention.

FIG. 9 is a block diagram 900 of a receive PCS/PMA interface according to an embodiment of the present invention. The parallel clocks in the PMA, i.e., RXCLKSYNC 930 and RXCLKASYNC 940, are derived from the output of the PLL 924 and two independent dividers: sync 926 and async 928. The RXCLKSYNC signal 930 is generated from the sync divider 926. The RXCLKSYNC signal 930 is required to be in phase with the data 932 and drives the root of the PCS XCLK tree when the PCS buffers are used. The digital receiver muxes RXCLKSYNC 930 onto RXCLKO 964 in this mode. The clock generated from the async divider 928, RXCLKASYNC 940, is driven out to the FPGA clock tree and can be used as the logic clock and fed back into the USR clocks.

Because the PCS XCLK tree and PMA RXCLKO have an unknown phase relationship, a phase alignment circuit 920 is used to manage the phase difference between the clock domains 922 and guarantee that the setup and hold times are met at the PCS/PMA boundary 922. Note that the phase adjustment circuit 920 only effects RXCLKSYNC 930 and not RXCLKASYNC 940. The receive phase alignment circuit 920 has one additional feature from the transmitter. The phase aligner 920 can be put into a bit slip mode where the rising edge of RXSYNC 950 will force receive data to shift in phase.

Thus, the receive phase aligner 920 has two modes of operation: phase align and bit slip. In phase align mode RXCLKSYNC 930 is phase aligned to the PCS XCLK 910. In phase align mode RXSYNC fabric signal 950 will enable the phase alignment circuit 920. Phase adjustment is a one-time event and occurs when RXSYNC 950 is transitioned from low to high. Phase alignment should not be initiated until the PLL 924 is locked. Once phase alignment has completed, the mode can be switched to bit slip for applications with stringent data uncertainty specifications. In this mode every rising edge of RXSYNC 950 will force a slip of any arbitrary amount on RXSYNCCLK 930 to provide a raw bit alignment capability. As long as this operation is contained to a byte boundary proper PCS/PMA timing relationships will be maintained. In this mode the RXRECCLK control block 960 simply muxes RXCLKASYNC 940 onto RXRECCLK 962.

Thus, a phase alignment circuit 920 is provided in the PMA to phase align its internally generated parallel clock to the PCS parallel clock. The phase alignment circuit 920 guarantees the timing relationship for the parallel data being passed between the PCS and PMA. With the phase alignment circuit 920, a buffer is no longer required and a single clock can be sourced from the fabric and used for synchronous operation throughout the entire system. Independent parallel clock dividers that are not affected by the phase adjustment circuit provide the appropriate application data frequency and can be used directly to clock the fabric interface with no fabric routing (phase) requirements.

Figure 10:
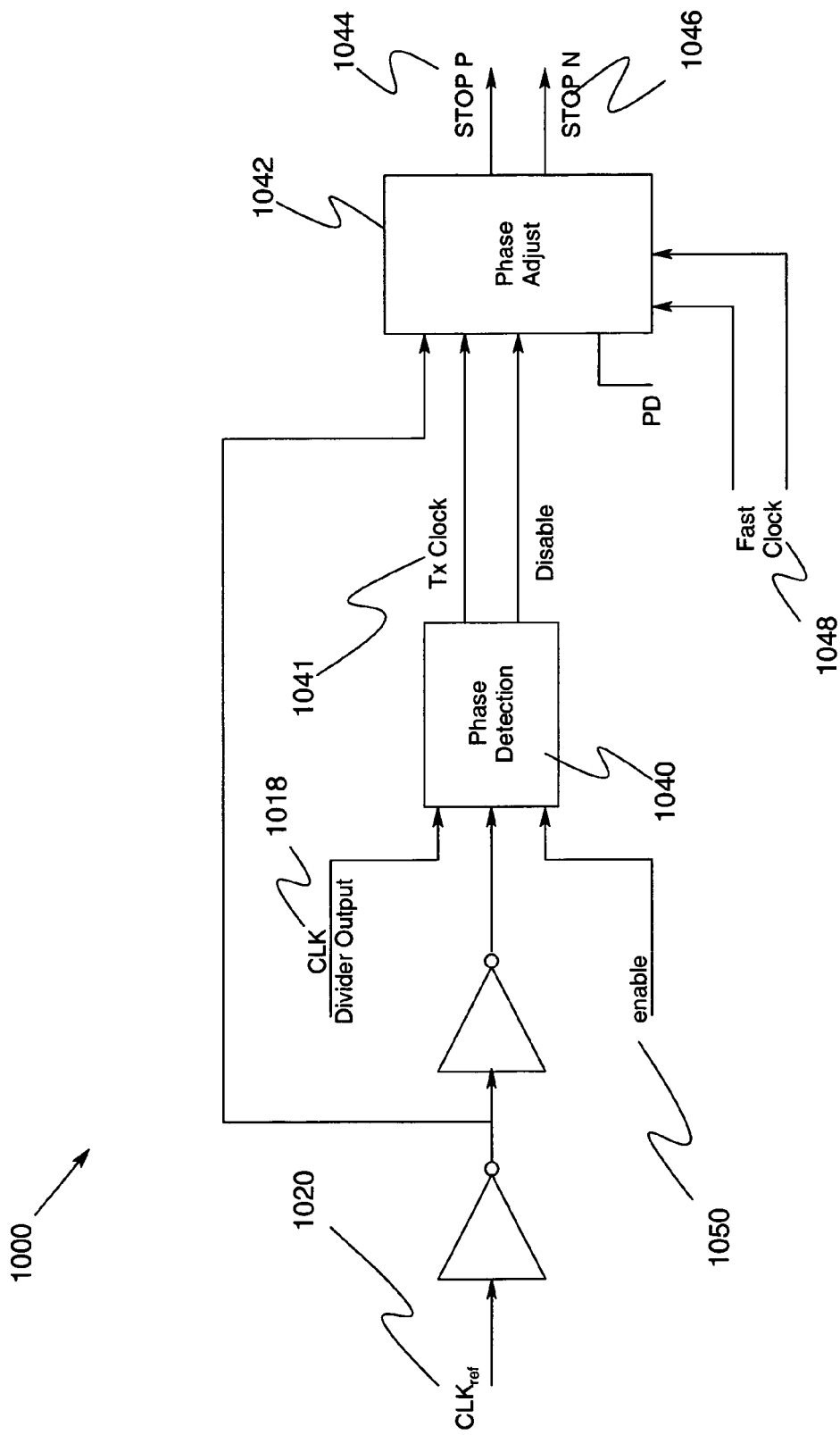
FIG. 10 is a schematic block diagram showing an example approach for implementing the phase aligner according to an embodiment of the present invention.

FIG. 10 is a schematic block diagram showing an example approach for implementing the phase aligner according to an embodiment of the present invention. A phase detection module 1040 and a phase adjust module 1042 are used to modify the otherwise normal functionality of a clock divider by providing an enable/disable signal at nodes 1044 and 1046. The phase adjust module 1042 provides this enable/disable signal for one period of the fast-clock signal (at node 1048) for each cycle of the reference clock 1020 when the reference clock 1020 and the signal 1018 are misaligned. The phase detection module 1040 informs the phase adjust module 1042 of this misalignment by comparing the edges of the reference clock 1020 with the edges of the signal 1018. The phase adjustment module 1042 compares the phases of the signals 1018 and 1020.

In channel-bonded applications where multiple outputs are bonded to provide a single channel, as illustrated with reference to FIG. 3, skew between multiple outputs must be controlled. With a large number of transceivers on a chip and with programmable clock routing, maintaining the alignment of multiple outputs can be difficult. Transmit outputs of multiple transceivers must be deskewed or skewed to compensate for misalignment.

Transmit outputs of multiple transceivers can be deskewed or skewed to compensate for other system reasons by adjusting the phase of the PLL reference clock or creating a static phase offset in the PLL. Circuits for adjusting the phase of the PLL reference dock or creating a static phase offset in the PLL will allow sub 1 UI control at data rates exceeding 10 Gbps.

Figure 11:
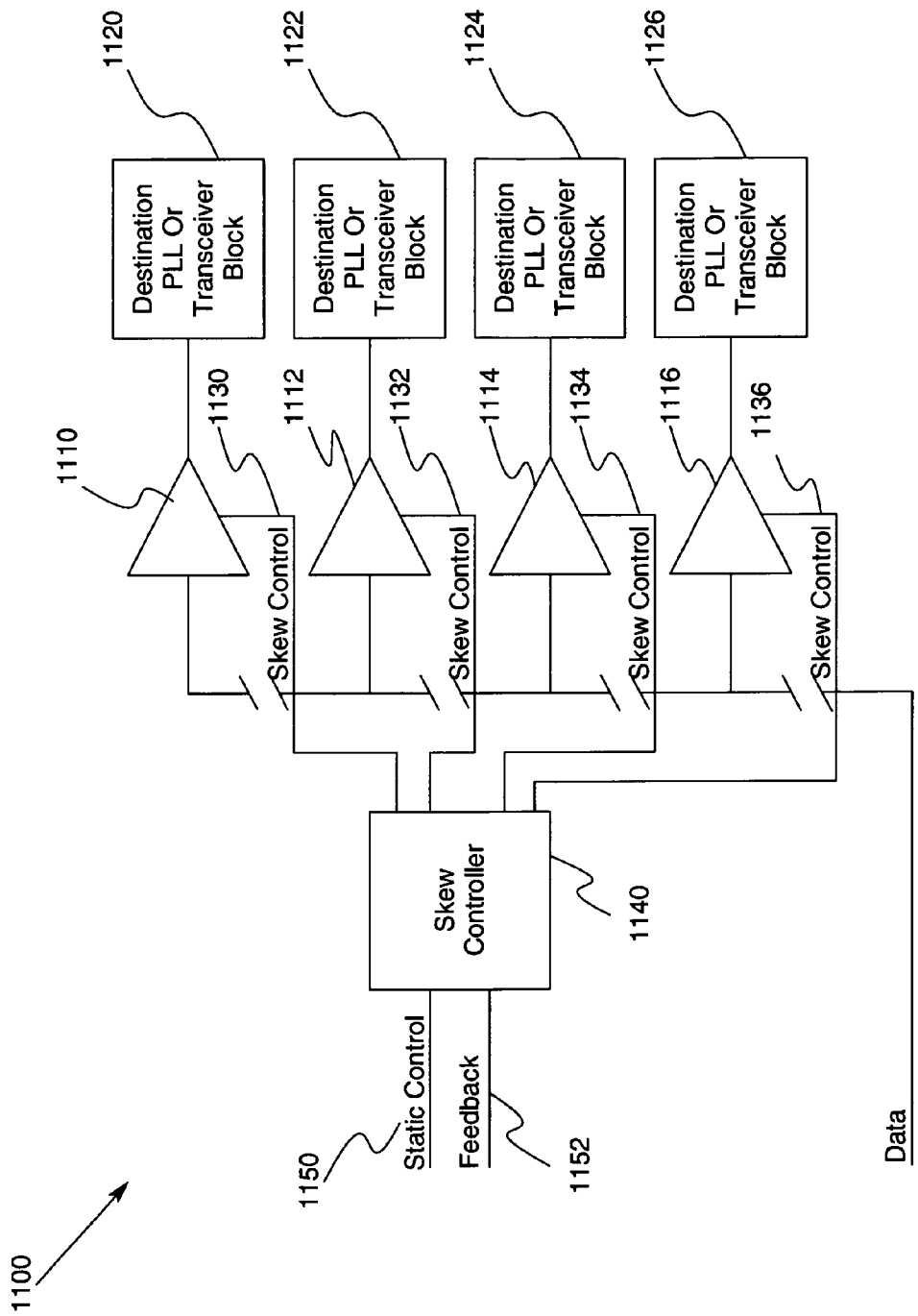
FIG. 11 illustrates a circuit for providing programmable skew to clock drivers according to an embodiment of the present invention.

FIG. 11 illustrates a circuit 1100 for providing programmable skew to clock drivers according to an embodiment of the present invention. In FIG. 11, four drivers 1110, 1112, 1114, 1116 providing a signal each to a destination PLL (such as a Rx PLL or a Tx PLL) or transceiver block 1120, 1122, 1124, 1126 are shown. The drivers 1110, 1112, 1114, 1116 include a skew control input 1130, 1132, 1134, 1136. In FIG. 11, a skew controller 1140 provides alignment to state machines of the transmit parallel-in serial-out register (PISO) to a reference timing signal. The skew controller 1140 provides programmable skew signals 1130, 1132, 1134, 1136 to clock drivers 1110, 1112, 1114, 1116 to deskew the outputs of the drivers 1110, 1112, 1114, 1116. The skew in the clock drivers 1110, 1112, 1114, 1116 compensates for the delays in the clock routing interconnect. The programming may be statically determined based on placement and loading 1150 or dynamically adjusted based on feedback from another point in the system 1152. The skew may be determined by adding or subtracting quantized delay elements, and/or by continuous delay adjustments based on a control input such as a bias current.

Figure 12:
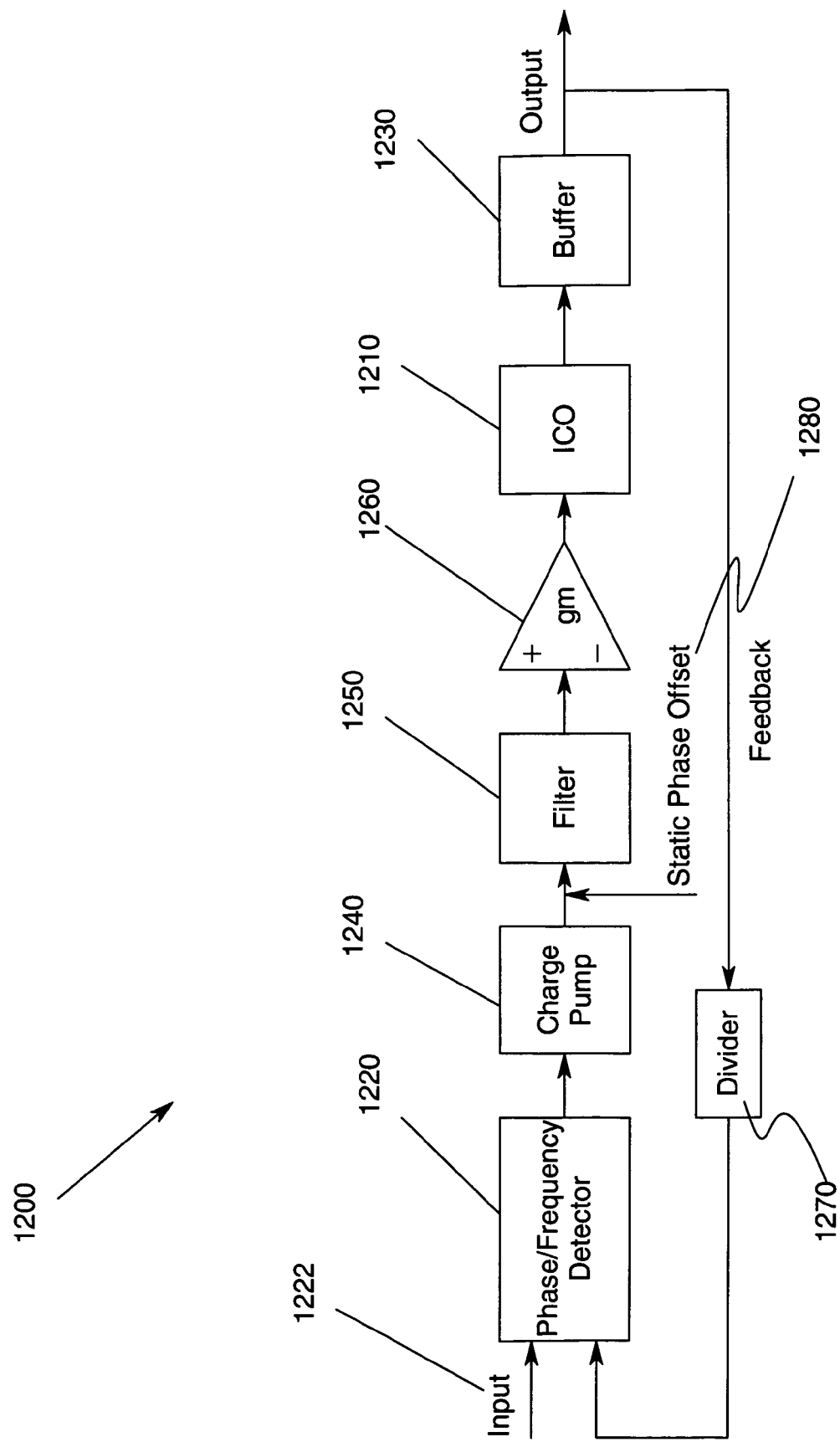
FIG. 12 is a block diagram of a PLL circuit having static phase offset in the PLL to skew the transmit outputs of multiple transceivers according to an embodiment of the present invention.

FIG. 12 is a block diagram 1200 of a PLL circuit having static phase offset in the PLL to skew the transmit outputs of multiple transceivers according to an embodiment of the present invention. Rather, than providing programmable skew by clocking drivers, phase offset may be provided by adjusting the signal between a charge pump output and loop filter input in a PLL 1200. However, those skilled in the art will recognize that both methods of provided skew as illustrated in FIGS. 11 and 12 may be used.

The PLL 1200 synchronizes a local oscillator 1210 with a remote oscillator or signal source. This ensures that the output frequency of the local oscillator 1210 is the same or a multiple of the remote signal, determined by the divider 1270, and that the output is in phase with the remote signal. The local oscillator 1210 may be a current controlled oscillator (ICO). This means that the frequency output of the ICO 1210 is controlled by varying a current input. The output signal of the ICO 1210 is fed back to a phase/frequency detector 1220 via a buffer 1230 and optionally divider 1270. The buffer 1230 isolates the ICO 1210 from the loading caused by the detector and external circuits. Thus, the buffer 1230 avoids "pulling" of the oscillator frequency.

The second input to the phase/frequency detector 1220 is the reference signal 1222, which has a frequency that the ICO 1210 locks to. If there is a difference in frequency or phase between the two inputs at the phase/frequency detector 1220, then an error signal is produced at the output of the phase/frequency detector 1220. This error signal is fed to the ICO 1210 via a charge pump 1240, a filter 1250 and transconductance amplifier 1260 to produce an error correcting current. The transconductance amplifier 1260 controls the current controlled oscillator 1210. A divider 1270 may be disposed in the feedback path to allow different input reference frequencies to be used to generate the output frequency. In embodiments where the input and output clock frequencies are the same, a divider is not needed in the feedback path.

As can be seen in FIG. 12, a charge pump 1240 is coupled to loop filter 1250. A static phase offset 1280 is provided for injecting a static positive or negative current at the charge pump output and loop filter input. The static phase offset 1280 adjusts the output phase of the PLL 1200.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A transceiver, comprising:
 a boundary phase aligner for providing synchronous clocking phase alignment between a first and a second functional module; and
 an output signal aligner for providing phase alignment in a plurality of outputs,
 wherein the output signal aligner is coupled to the boundary phase aligner and comprises:
  a plurality of drivers configured for providing channel bonding for output data, each of the plurality of drivers including a data port for receiving data and an output for transmitting data; and
  a skew controller coupled to the plurality of drivers, the skew controller providing a skew control signal to each of the plurality of drivers, the skew control signal to each of the plurality of drivers providing alignment of the outputs of the plurality of drivers;
 and wherein the output signal aligner further comprises a phase locked loop, the phase locked loop including an amplifier, a local oscillator, a charge pump, and a loop filter, wherein a static phase offset signal is injected at an output of the charge pump output and an input of the loop filter to provide a static current input for adjusting an output phase of the local oscillator.

2. The transceiver of claim 1, wherein the boundary phase aligner further comprises:
 a first functional module clock generator for generating a first functional module parallel clock; and
 a phase alignment device, coupled to the first functional module clock generator, for receiving a second functional module parallel clock and phase aligning the first functional module parallel clock to the second functional module parallel clock.

3. A transceiver, comprising:
 a PCS/PMA boundary phase aligner for providing PMA/PCS synchronous clocking phase alignment; and
 an output signal aligner for providing phase alignment in a plurality of outputs,
 wherein the output signal aligner is coupled to the PCS/PMA boundary phase aligner and comprises a phase locked loop, the phase locked loop including an amplifier, a local oscillator, a charge pump and a loop filter, wherein a static phase offset signal is injected at an output of the charge pump output and an input of the loop filter to provide a static current input for adjusting an output phase of the local oscillator;
 and wherein the output signal aligner further comprises:
  a plurality of drivers configured for providing channel bonding for output data, each of the plurality of drivers including a data port for receiving data and an output for transmitting data; and
  a skew controller, coupled to the plurality of drivers, the skew controller providing a skew control signal to each of the plurality of drivers, the skew control signal to each of the plurality of drivers providing alignment of the outputs of the plurality of drivers.

4. The transceiver of claim 3, wherein the PCS/PMA boundary phase aligner further comprises:
 a PMA clock generator for generating a physical medium attachment layer parallel clock; and
 a phase alignment device, coupled to the PMA clock generator, for receiving a physical coding sub-layer parallel clock and phase aligning the physical medium attachment layer parallel clock to the physical coding sub-layer parallel clock.

5. A programmable logic device, comprising:
 input/output blocks (IOBs) for providing interconnections between elements;
 configurable logic blocks (CLBs) for implementing logical functions of the programmable logic device; and
 at least one transceiver for processing data, the transceiver comprising:
  a boundary phase aligner for providing synchronous clocking phase alignment between a first and a second functional module; and
  a output signal aligner for providing phase alignment in a plurality of outputs,
  wherein the output signal aligner is coupled to the boundary phase aligner and comprises a phase locked loop, the phase locked loop including an amplifier, a local oscillator, a charge pump and a loop filter, wherein a static phase offset signal is injected at an output of the charge pump output and an input of the loop filter to provide a static current input for adjusting an output phase of the local oscillator;
  and wherein the output signal aligner further comprises:
   a plurality of drivers configured for providing channel bonding for output data, each of the plurality of drivers including a data port for receiving data and an output for transmitting data; and
   a skew controller, coupled to the plurality of drivers, the skew controller providing a skew control signal to each of the plurality of drivers, the skew control signal to each of the plurality of drivers providing alignment of the outputs of the plurality of drivers.

6. The programmable logic device of claim 5, wherein the boundary phase aligner further comprises:
 a first functional module clock generator for generating a first functional module parallel clock; and
 a phase alignment device, coupled to the first functional module clock generator, for receiving a second functional module parallel clock and phase aligning the first functional module parallel clock to the second functional module parallel clock.

7. A programmable logic device, comprising:
 input/output blocks (IOBs) for providing interconnections between elements;
 configurable logic blocks (CLBs) for implementing logical functions of the programmable logic device; and
 at least one transceiver for processing data, the transceiver comprising:
  a PCS/PMA boundary phase aligner for providing PMA/PCS synchronous clocking phase alignment; and an output signal aligner for providing phase alignment in a plurality of outputs,
wherein the output signal aligner is coupled to the PCS/PMA boundary Phase aligner and comprises:
 a plurality of drivers configured for providing channel bonding for output data, each of the plurality of drivers including a data port for receiving data and an output for transmitting data; and
 a skew controller coupled to the plurality of drivers, the skew controller providing a skew control signal to each of the plurality of drivers, the skew control signal to each of the plurality of drivers providing alignment of the outputs of the plurality of drivers;
wherein the output signal aligner further comprises a phase locked loop, the phase locked loop including an amplifier, a local oscillator, a charge pump, and a loop filter, wherein a static phase offset signal is injected at an output of the charge pump output and an input of the loop filter to provide a static current input for adjusting an output phase of the local oscillator.

8. The programmable logic device of claim 7, wherein the PCS/PMA boundary phase aligner further comprises:
 a PMA clock generator for generating a physical medium attachment layer parallel clock; and
 a phase alignment device, coupled to the PMA clock generator, for receiving a physical coding sub-layer parallel clock and phase aligning the physical medium attachment layer parallel clock to the physical coding sub-layer parallel clock.

* * * * *